(12) United States Patent
Monsallut

(10) Patent No.: US 6,259,530 B1
(45) Date of Patent: Jul. 10, 2001

(54) METHOD AND DEVICE FOR MEASURING THE DEPTHS OF BOTTOMS OF CRATERS IN A PHYSICO-CHEMICAL ANALYZER

(75) Inventor: Pierre Monsallut, Paris (FR)

(73) Assignee: CAMECA, Courbevoie (FR)

( * ) Notice: Subject to any disclaimer, the term of this patent is extended or adjusted under 35 U.S.C. 154(b) by 0 days.

(21) Appl. No.: 09/265,600

(22) Filed: Mar. 10, 1999

(30) Foreign Application Priority Data

Mar. 13, 1998 (FR) .................................................. 98 03133

(51) Int. Cl.$^7$ ........................................................ G01B 9/02
(52) U.S. Cl. ............................................. 356/487; 356/516
(58) Field of Search .................................. 356/516, 487, 356/489, 493, 450, 486

(56) References Cited

U.S. PATENT DOCUMENTS 5,371,582 12/1994 Toba et al. .
5,523,839 * 6/1996 Robinson et al. ................... 356/349
5,699,160 12/1997 Barenboim et al. .

OTHER PUBLICATIONS

"Nondestructive Measurement Of Groove Depth Of Optical Disks," IBM Technical Disclosure Bulletin, vol. 29, No. 11, (Apr. 1997), pp. 4798–4799.

G. Makosch, et al., "Interferometric Method For Step Height Measurements On Surfaces With Variable Tilts," IBM Technical Disclosure Bulletin, vol. 23, No. 4, (Sep. 1980), pp. 1485–1486.

* cited by examiner

*Primary Examiner*—Frank G. Font
*Assistant Examiner*—Andrew H. Lee
(74) *Attorney, Agent, or Firm*—Oblon, Spivak, McClelland, Maier & Neustadt, P.C.

(57) ABSTRACT

Disclosed is a method for measuring the depth of the bottoms of craters under formation on a sample placed within an analysis chamber of a physico-chemical analyzer, by optical interferometry. The method consists in splitting an incident bi-frequency laser beam into two parallel paths, a measurement path and a reference path, focusing each of the two paths on the surface of the sample, respectively one in the crater and the other in the vicinity, along an incident direction inclined in relation to the surface of the sample, recombining the two beams reflected on the surface of the sample to form only one beam, and applying the recombined beam to an interferometric detector to measure the path difference between the two reflected beams. Application to ion analyzers.

12 Claims, 2 Drawing Sheets

METHOD AND DEVICE FOR MEASURING THE DEPTHS OF BOTTOMS OF CRATERS IN A PHYSICO-CHEMICAL ANALYZER

BACKGROUND OF THE INVENTION

1. Field of the Invention

The present invention relates to a method and device for the measurement of crater bottoms obtained by the bombardment, with a beam of primary ions, of a sample during its physico-chemical analysis.

2. Description of the Prior Art

One of the methods of analysis particularly suited for the performance of these analyses is the method that uses the SIMS or secondary ion mass spectrometer. This method analyzes the mass of secondary ions by spectrometry.

With these devices, it is often necessary to make measurement, during analysis, of the depth of the craters formed by the impact of the ion beam on the surface of the analyzed sample, especially when the sample has several superimposed layers of material as is the case for samples formed by several layers of superimposed semiconductor materials. The craters obtained are generally very small-sized. They are about 100 $\mu$m long and their depth varies during erosion between 1 nm and some $\mu$m for an erosion speed of 0.1 to 10 nm/s. The record of the physico-chemical composition of the sample in its different layers is generally done by drawing up a correspondence, during analysis, between the time of analysis during which the sample is subjected to ion bombardment and the depth of the resulting crater, this parameter being measured by means of a surface profiler. This method of measurement entails constraints because it requires the removal of the sample from the analyzer whenever an in-depth measurement has to be made. It also lacks precision.

To overcome these drawbacks, It has been proposed to use a measurement device applying the principle of optical interferometry. For the implementation of this principle, a beam of monochromatic and coherent light is split at a determined place into two beams. Each beam gets propagated in space, along a trajectory that is proper to it, up to another place where the two beams are recomposed into one by an appropriate optical system. The beam resulting from this recomposition is thus formed by the sum of two beams having travelled different lengths of space. The difference in length is often called a path difference. The beams are phase-shifted with respect to each other. The phase shift thus created gives rise to a system of interference fringes formed by alternations of weak and strong luminous intensities. Depending on the structures involved, the system of fringes may or may not be localized and it may or may not be wide. The relative variation of the path difference is determined by counting the fringes flowing past a given space. In this system, the quality of the measurement depends on the contrast between bright fringes and dark fringes and therefore on the signal-to-noise ratio as well as the interpolation that can be made. A well-known interferometer working according to the above-described principle is the Michelson interferometer, a description of which can be found for example in G. Bruhat and A. Kastler, Cours de Physique Générale, <<Optique>>, Masson et Cie, 120 bd. Saint Germain, Paris VI, page 135. In this interferometer, the period of the pattern of fringes corresponds to a path difference of $\lambda$ where $\lambda$ is the wavelength of the light beam. The path difference that results from two to-and-fro trips of the two beams on reflecting targets makes it possible to measure a variation of $\lambda/2$ in the relative distance of the two targets. For example, if the light source is a helium-neon laser, $\lambda/2 = 316.5$ nm in vacuum. This resolution may be improved to $\lambda/2$ or $\lambda/16$ by interpolation, that is, by about 40 nm in exceptional conditions. Indeed, these interferometers remain highly sensitive to the variations of contrast that may be prompted by the possible variations of the reflectivity of one of the two targets and it is very difficult to position them in the analysis chamber of an SIMS ion analyzer because of the 90° orientation of the beam-returning mirrors with respect to one another, one of the mirrors being formed on the surface of the sample itself.

One method of measurement that can be used in SIMS analyzers is described in an article by M. J. Kempf, "On-line Sputter Rate Measurements During SIMS, AES Depth Profiling", published by A. Benninghoven et al., Springer-Verlag Publications, Berlin-Heidelberg-New York, 1979. A variant of this method is described in the U.S. Pat. No. 4,298,283, "Interferometric measuring method". This variant uses a laser interferometer whose incident beam is split into two paths by a calcite crystal before being directed, in the analysis chamber of an SIMS analyzer, on to the analyzed sample in a direction normal to the sample. The two reflected beams are redirected to the calcite crystal and then recombined into a single beam and form an interference system that depends on the "path difference" between the two beams.

This method enables the performance of very accurate measurements of depth of about 1 nanometer throughout the time of the analysis. On the other hand, it requires very delicate adjusting of the interferometer because the result of the measurements is highly dependent on the orientation of the sample in relation to the direction of the two beams.

Another method, also described in the above-described patent as well as in the U.S. Pat. No. 4,353,650 entitled "Laser Heterodyne Surface Profiler" implements the known principle of heterodyne interferometry. It is consists not in detecting a difference of luminosity of the fringe system to count the fringes that flow past, but in measuring the phase shift of an information element contained in the system with respect to the same information contained in the light source before the splitting of the beams. This method makes it possible to remove the dependence on the contrast variations so long as the signal-to-noise ratio remains appropriate. The fine measurement of this phase shift may attain $\frac{1}{256}$ of the temporal period. If the interferometer is such that a phase shift of one temporal period corresponds spatially to a path difference of $\lambda/2$, a resolution of $\lambda/512$ or 1.25 nm is obtained. The implementation of a heterodyne interferometer requires the use of a light source which is no longer a monochromatic but a bi-frequency source. This source sends two beams that are quite cylindrical. Their difference in frequency may be about 3 MHz or 20 MHz. The two frequency components are polarized in a monoplane and are mutually orthogonal. An output beam fraction is sent to an analyzer, fixedly adjusted at 45° with respect to the two polarization planes, which lets through a fraction of the two components in the same output plane. A photodetector placed behind the analyzer is modulated at the half-sum frequency and at the half-difference frequency. The half-sum frequency is beyond the bandpass of the detector. The half-difference frequency is used as a phase reference. The output signal of the photodetector is shaped as a square-wave signal. The two orthogonally polarized components are then split by an interferometer to form two beams which are sent on two distinct paths, a path called a reference path and a path called a measurement path. After reflection on the target, the two beams are recombined on the same axis with mutually orthogonal plane directions of polarization and the whole resultant beam is applied to a detector which measures the path difference of the two beams. The detector consists of an analyzer fixedly adjusted at 45° with respect to the two directions of polarization received. A photodetector located behind receives the sum signal of the two frequencies and, like the detector located in the source, gives a low frequency square-wave signal. If the two targets are not in relative motion, this signal is at the same frequency as the one given by the detector of a fixed value, but it is simply phase shifted by a fixed value which depends on the lengths of the paths of the two beams.

If $f_1$ is the frequency of the first beam and $f_2$ the frequency of the second beam, L is the sum of the distances between the laser source and the interferometer and from the interferometer to the detector, $L_1$ is the length of the measurement beam outside the interferometer and $L_2$ is the length of the reference beam, then in the conventional interferometers, the path difference $\Delta L = L_1 - L_2$ gives the value of the phase shift to within $2 k\pi$ and in the heterodyne technique the phase shift depends greatly on the path difference $\Delta L$ and in a negligible way on the variations of the path $L+(L_1+L_2)/2$ of the common mode.

Thus, for a Michelson type interferometer, a relative shift of the targets by $\lambda/2$, corresponds to a $2\pi$ phase shift of the spatial signal and a common mode variation induces no change. In the heterodyne technique, a relative shift of the targets by $\lambda/2$ will correspond to a phase shift of the temporal signal by $2\pi$.

The polarization splitting interferometers can be distinguished from one another according to whether they are of the single, double, quadruple or composite type. A large number of these interferometers have been built and commercially distributed by the US firm Hewlett Packard.

To adapt a mass spectrometer to the measurement of small-sized craters in an ion analyzer, a certain number of constraints have to be met. First of all, it is out of the question to seek to measure craters having diameters of 100 $\mu$m with 3 mm cylindrical beams. Furthermore, the diameter of the beam at the position of the crater must be smaller than 100 $\mu$m to prevent edge fringing effects. Unfortunately, a beam of this kind has excessive divergence. However, a 60 $\mu$m waist can be obtained by focusing a 3 mm beam with an aberration-free thin convergent lens having a focal length of 223 mm. But, assuming that it is possible to send the beam to the sample, it is necessary to make it possible to return it into the interferometer on the appropriate axis, with the appropriate diameter. The normal to the sample at the point of impact is not necessarily the same as the optical axis of the secondary ions column (difference of up to ±1 mm) of the physico-chemical analyzer. When however it is the same, this axis passes through several apertures and slits of small sizes or even zero sizes. This excludes a passage of the beam by this axis because of problems of distortion of the wave fronts, collimation and adjusting. It appears to be preferable that the beam should come at an oblique incidence so as to get reflected symmetrically with respect to the normal by specular reflection. For example, a polished silicon sample (crystalline or polycrystalline) has a specular reflection coefficient of about 30% but also has reflection by scattering that is sufficiently intense to be seen by the naked eye with a 1 mW beam. Thus, by preserving a photonic observation optical system, it is possible to always observe the point of impact on the sample to adjust the system in order to point it at the location of the future crater. The usefulness of specular reflection is that it is of the metallic type and does not affect the polarization.

A first approach to a solution may consist in using the divergent reflected beam which, after a new 223 mm path, will have a diameter of 3 mm. It will then be enough to refocus it by a second 223 mm lens to make it acceptable by the interferometer. Thus, it may be sent back by a complex set of mirrors, in taking care to preserve the orientation of the polarization plane. If, for example, we use the Hewlett Packard HP 10702A interferometer, the beam may be sent back to a position 12.7 mm beside its starting point.

One possible assembly may comprise a sort of fork straddling the analysis chamber one path of the fork comprises the interferometer, the laser head and the detector while the other path is the returning system. The aim is adjusted by mechanically shifting the fork about the body. However, in this approach, each variation, even a minute variation, of the tilt of the sample, namely its position with respect to fixed reference axes of the analyzer, requires an adjustment of the assembly. The measurement path goes through a part of the column and a part of the fork. Its length remains very sensitive to the vibrations of the sample and the thermal expansion of the elements. The fundamental resolution is $\lambda/2$ giving $\lambda/512 = 1.2$ nm after processing.

A second approach may consist in returning the beam reflected by a plane mirror on itself and therefore on to the sample. The drawback is that, in being allowed to diverge, this beam will have a prohibitive diameter in the interferometer and will have a section of several mm at the sample. It will get reflected poorly, on an unequal surface, and will be hampered in its passage by its great diameter. One solution would be to send it back to the sample in refocusing it, with the same aperture angle. It is then enough to use a spherical mirror whose center of curvature is almost the same as the point of impact on the sample. This arrangement has several major advantages. So long as the beam strikes the surface of the mirror, it is sent back on itself, whatever the required tilt of the sample. With a surface of the mirror compatible with the mechanical environment, a tolerance of ±0.1° in roll and pitch is acceptable. The alignment of this mirror is very simple: the image of the initial point of impact given by the mirror is a second point of the same size on the sample, which is merged with it when the mirror is aligned. A simple two-axis tilt motion of the mirror is sufficient. It is enough to try to merge the two spots on the sample. Since the measurement beam makes two to-and-fro trips, the double interferometer thus achieved makes it possible to obtain a fundamental resolution of and of $\lambda/4$, and of $\lambda/1024 = 0.6$ nm after processing. The return beam goes back through the same focusing lens. It is therefore sent back on itself, in the interferometer, with a diameter of 3 mm. Thus, the use of a Hewlett Packard type interferometer HP 10705A should be suitable, with the drawback that the reference path is located in the interferometer, and that the system is not differential and is therefore sensitive to the absolute value of the measurement path. If the analysis chamber is an alloy L316 and if the sample is at least at a distance of 160 mm from the interferometer, then a very small variation in temperature of 1° C. in the material induces a variation of this distance of about 2500 nm. A variation of less than 1 nm/s requires a temperature stability greater than $\frac{1}{2500}$° C./s.

To overcome these drawbacks, another approach may consist in using a differential interferometer, the two paths being sent to the sample, one in the crater and the other on the surface in the vicinity of the crater. The path difference depends in principle only on the depth of the crater and the angle of incidence. The interference values given by the two beams which are close to each other will not be disturbed if there is a distance of at least 100 $\mu$m between their axes. A value of 200 µm may be chosen. It may be then be planned to use HP 10715A or HP 10719A type Hewlett Packard interferometers having two parallel measurement double paths. Thus, with the four beams being sent to the sample, only one beam being in the crater, the fundamental resolution therefore is not $\lambda/8$ but $\lambda/4$, as in the second approach. If only one beam of each path is used, the other two beams being reflected by means of mirrors fixed to the interferometer, the resolution obtained is still $\lambda/4$, with one beam in the crater and the other on the surface in the vicinity.

The problem then is to focus the two beams by obtaining two 60 µm spots, close to each other by 200 µm approximately, and to send them back on themselves. Assuming that it is possible to send two spots meeting these conditions to the sample, their axes being parallel or not parallel with each other, by means of a single spherical mirror, its center can be aligned only on one single spot or between the two spots. When the center is located on a single spot, the second ray gets reflected at a point of the sample that is symmetrical with respect to the center. It then becomes very complicated to send it back to the interferometer and, in this case, the path difference will not depend only on the depth of the crater. When the center is placed between the spots, each spot is reflected on the other and the total path difference becomes zero. Furthermore, the return beams are no longer quite on the axes of the incident beams. Finally, if two mirrors are positioned with their centers at 200 µm from each other in order to send back beams with a diameter of over 2 mm, the problem becomes insoluble.

The aim of the invention is to obtain a measurement device relying on the principle of heterodyne interferometry and using a polarization splitting interferometer that does not have the drawbacks of the above-mentioned interferometers.

SUMMARY OF THE INVENTION

To this end, an object of the invention is a method for measuring the depth of the bottoms of craters under formation on a sample placed within an analysis chamber of a physico-chemical analyzer, by optical interferometry, wherein said method consists in:

splitting an incident bi-frequency laser beam into two parallel paths, a measurement path and a reference path, focusing each of the two paths on the surface of the sample, respectively one in the crater and the other in the vicinity, along an incident direction inclined in relation to the surface of the sample, recombining the two beams reflected by the surface of the sample to form only one beam, and applying the recombined beam to an interferometric detector to measure the path difference between the two reflected beams.

An object of the invention is also a device for the implementation of the above-mentioned method.

The method according to the invention has the main advantages of having its two measurement paths inside the analysis chamber of the ion analyzer. This prevents the need for air index compensation for example. It makes it possible to obtain differential measurements of the depth of the crater. Finally, by doubling each path, it is possible according to the invention to obtain a fundamental resolution of $\lambda/4$, giving a resolution of 0.6 nm after processing through the use of a helium-neon laser. It also has the advantage of being very compact and insensitive to the tilt of the sample especially after each change of sample.

BRIEF DESCRIPTION OF THE DRAWINGS

Other features and advantages of the invention shall appear from the following description made with reference to the appended drawings, of which.

MORE DETAILED DESCRIPTION

Figure 1:
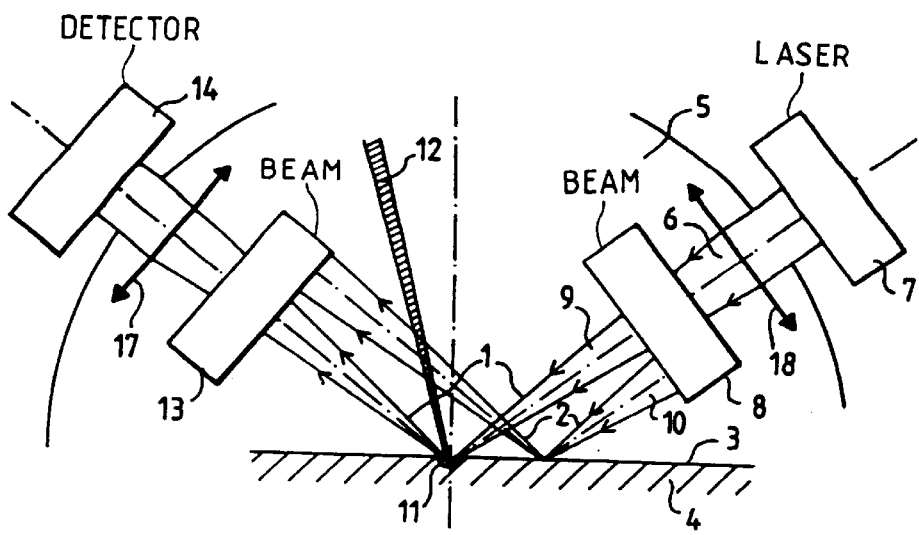
FIG. 1 shows a schematic drawing of the implementation of a differential interferometer the measurement of small-sized craters according to the invention.

As shown in FIG. 1, the method according to the invention implements a beam splitting differential interferometer comprising a measurement path 1, a reference path 2 inclined in relation to the surface 3 of a sample 4 being tested within a chamber 5 of an ion analyzer. The beams forming the measurement paths are obtained from a laser beam 6 produced by a bi-frequency laser source 7. An optical splitting system 8 splits the laser beam 6 into two parallel beams 9, 10 respectively-forming the measurement path 1 and the reference path 2, which are focused by the lens 18 on the surface 3 of the sample 4, respectively one beam on the bottom of a crater that is being eroded by the particle beam 12 emitted by the ion analyzer, and the other beam beside the crater 11. The beams 9 and 10, after reflection on the surface 3 of the sample 4, are recombined by a second optical splitting system 13 identical to the first one 8 and collimated by a lens 17. An interferometric detector 14 receives the recombined and collimated beam coming from the second optical splitting system 13. The optical splitting systems of the beam 8 and 13 may be formed by any type of polarization splitting device or again by birefringent crystals. According to the embodiment of FI3G. 1, the resolution that can be obtained is $\lambda/2$.

Figure 2:
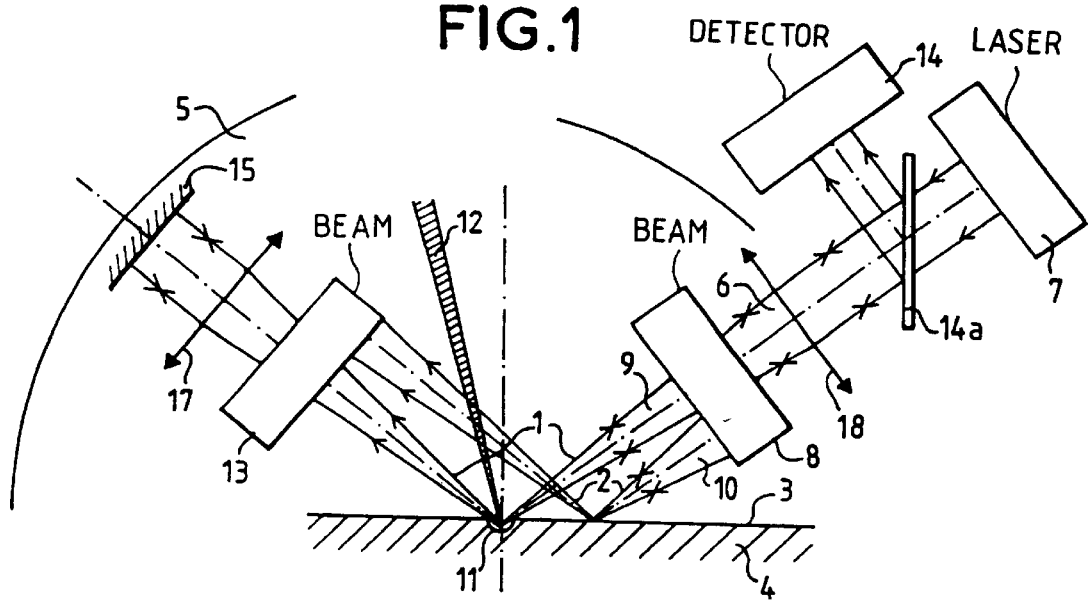
FIG. 2 shows a second example of an implementation of a differential interferometer according to the invention.
Figure 3:
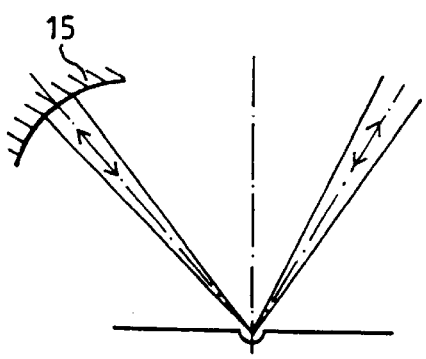
FIGS. 3 and 4 show two embodiments of the beam returning system used to make the interferometer of FIG. 2.
Figure 4:
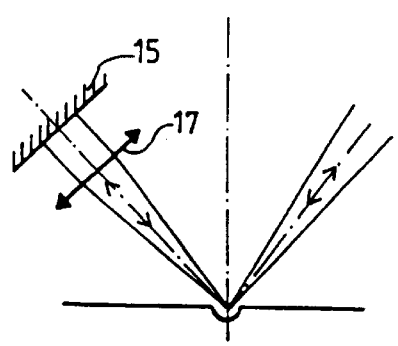

A resolution of $\lambda/4$ may be obtained according to the embodiment of FIG. 2 where the elements homologous to those of FIG. 1 are shown with the same references. In this embodiment, the beams reflected on the sample 4 are sent back on themselves by a beam-returning system 15 placed at output of the second beam splitter optical device 13. They are then recombined by the input focusing and splitting optical device 8 which is crossed in the other direction. Unlike the differential interferometer of FIG. 1, the one shown in FIG. 2 has an optical device 14a, in the form for example of a semi-transparent mirror that is a splitter of the returning beam recombined by the optical splitting device 8 to send back the recombined returning beam to the detector 14. The system shown in FIG. 2 has the advantage of having a resolution of $\lambda/4$ as compared with the system of FIG. 1 and of being insensitive to the alignment defect of the sample 4 in the analysis chamber. As in the case of the system of FIG. 1, the beam splitters 8 and 13 are identical, and may be formed by any type of known polarization splitter or by a birefringent crystal. As shown in FIGS. 3 and 4, the beam-returning system 15 may be formed by a spherical mirror or by a plane mirror associated with a convergent lens 17.

Figure 5:
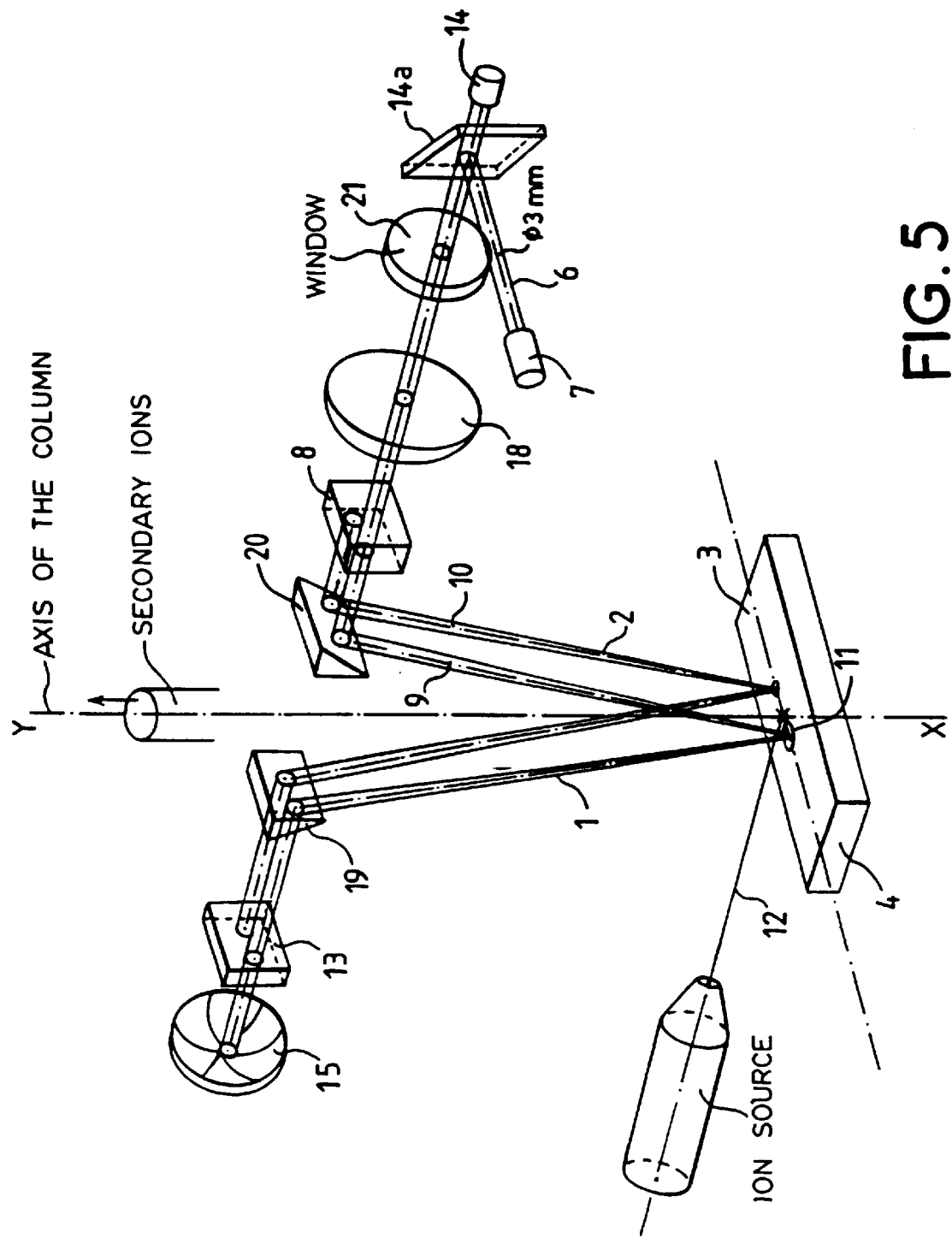
FIG. 5 shows a detailed embodiment of the interferometer of FIG. 2.

A more detailed exemplary embodiment of the device of FIG. 2 is shown in a perspective view in FIG. 5 where the homologous elements are shown with the same references. In this example, the beam splitters 8 and 13 are formed by crystals of Iceland spar or calcite $CaCO_3$. The crystal 13 is placed between the spherical beam-returning mirror 15 and the sample 4. The beams that are incident and reflected on the mirror 15 are merged and pass through the center of curvature of the mirror. They get converted into two parallel beams spaced at about 0.2 mm between the crystal 13 and the sample 4. These beams converge on the sample 4 at two 60 μm spots, one of them being almost merged with the center of curvature of the mirror 15. With these two beams, there are associated two parallel divergent beams, symmetrical with the former two beams with respect to the direction normal to the surface 3 of the sample. These two divergent beams are applied to the second calcite crystal 8 to be recombined into a single beam of parallel rays by a focusing lens 18. This beam conveys the laser ray 6 emitted by the laser head 7 in one direction. In the other direction, it conveys the resultant ray of the sum of the two beams reflected on the sample 4 intended for the detector 14. As in FIG. 2, the semi-transparent mirror 14a splits the laser beam from the resultant ray applied to the detector 14. Beam-returning mirrors 19 and 20 are positioned on the optical paths of the two measurement beams 1 and 2 so as to align the optical axes of the spherical mirror 15 and the focusing lens 18 in a direction normal to the axis of the column X, Y of the ion analyzer while keeping tilted directions for the beams that are convergent and divergent on the sample 4. This arrangement facilitates the construction of the interferometer within the analysis chamber, especially by freeing the space needed for the circulation of secondary ions extracted from the sample in the direction of the axis of the column. A window 21 fixed to the wall of the analysis chamber enables the isolation of the laser head 7 and the detector 14 from the remainder of the components forming the interferometer. The common beam applied to the semi-transparent mirror 14a passes through this window.

What is claimed is:

1. A method for measuring the depths of the bottoms of craters under formation on a sample placed within an analysis chamber of a physico-chemical analyzer, by optical interferometry, the method comprising the steps of:

splitting, by a splitting device, an incident bi-frequency laser beam into a measurement path and a reference path, wherein the measurement path is parallel to the reference path;

focusing each of the measurement path and the reference path on the surface of the sample, respectively the measurement path in the crater and the reference path in the vicinity of the crater, along an incident direction inclined in relation to the surface of the sample;

recombining, by a recombining device two beams reflected on the surface of the sample by the measurement path and the reference path to form only one beam, wherein the splitting device is separate from the recombining device; and applying the recombined on beam to an interferometric detector to measure the path difference between the two reflected beams.

2. A method according to claim 1, wherein the splitting device and the recombining device are identical beam splitters.

3. A method according to either of claims 1 and 2, wherein the splitting device and the recombining device are identical polarization splitters.

4. A method according to claim 3, wherein the polarization splitters comprise birefringent crystals.

5. A method according to claim 4, further comprising sending back, to the interferometric detector, by auto-collimation, the two beams focused on the surface of the sample by a spherical mirror centered on the point of impact in making the two beams travel on an optical path that is the reverse of the path of focusing of the measurement path and the reference path on the sample.

6. A method according to claim 5, further comprising recombining the two returned beams into a beam of parallel rays that is merged with the laser beam of the incident beam before applying it to the interferometric detector.

7. A measuring device for the measurement of the depth of the bottoms of craters being formed on a sample placed inside an analysis chamber of a ion analyzer, the measuring device comprising:

a laser, wherein the laser emits an incident bi-frequency laser beam;

a beam-splitter, wherein the beam-splitter splits the incident laser beam into a measurement path and a reference path, wherein the measurement path is parallel to the reference path;

a focusing device, wherein the focusing device focuses, on the surface of the sample, a beam for the measurement path in the crater and a beam for the reference path in the vicinity of the crater, in an incident direction inclined to the surface of the sample;

a recombining device, wherein the recombining device recombining the beam for the measurement path and the beam for the reference path reflected on the surface of the sample to form only one beam, and wherein the beam-splitter is separate from the recombining device; and an interferometric detector wherein the interferometric detector measures the path difference between the two reflected beams, and wherein the laser and the interferometric detector are placed outside the analysis chamber.

8. A measuring device according to claim 7, wherein the recombining device is identical to the beam-splitter.

9. A measuring device according to any of the claims 7 and 8, further comprising a reflector, wherein the reflector sends the two reflected beams back to the interferometric detector in an optical path that is the reverse of the focusing path of the two paths on the sample, doubling the fundamental resolution of the device.

10. A measuring device according to claim 9, wherein the reflector comprises a spherical mirror.

11. A measuring device according to claim 9, wherein the reflector comprises a plane mirror coupled to a convergent lens.

12. A measuring device according to claims 7 or 8, wherein the beam-splitter comprises a polarization-splitter comprising birefringent calcite crystals.

* * * * *